United States Patent
Riedl (10) Patent No.: US 9,623,847 B2
(45) Date of Patent: Apr. 18, 2017

(54) SUPPORT WINCH (71) Applicant: SAF-HOLLAND GmbH, Bessenbach (DE)

(72) Inventor: Reinhold Riedl, Miltenberg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 53 days.

(21) Appl. No.: 14/568,303

(22) Filed: Dec. 12, 2014

(65) Prior Publication Data

US 2015/0166022 A1    Jun. 18, 2015

(30) Foreign Application Priority Data

Dec. 13, 2013    (DE) .................. 10 2013 225 933

(51) Int. Cl.
*B60S 9/08*    (2006.01)
*G05G 5/04*    (2006.01)

(52) U.S. Cl.
CPC .................. *B60S 9/08* (2013.01); *G05G 5/04* (2013.01); *Y10T 74/20642* (2015.01)

(58) Field of Classification Search
CPC ...... B60S 9/08; B60S 9/02; B60S 9/06; B60S 9/04; B60S 9/12; B60S 9/16
See application file for complete search history.

(56) References Cited

U.S. PATENT DOCUMENTS

| | | | | |
|---|---|---|---|---|
| 2,446,517 A | * | 8/1948 | Black | B60D 1/66 254/419 |
| 3,259,364 A | * | 7/1966 | Hulverson | B60D 1/66 254/419 |
| 3,870,271 A | * | 3/1975 | Bowman | A47C 3/24 108/142 |
| 3,880,403 A | * | 4/1975 | Glassmeyer | B60S 9/18 254/419 |
| 4,796,864 A | * | 1/1989 | Wilson | B60S 9/08 254/103 |
| 5,199,738 A | * | 4/1993 | VanDenberg | B60S 9/08 192/69.91 |
| 5,423,518 A | * | 6/1995 | Baxter | B60S 9/08 254/419 |
| 6,099,016 A | * | 8/2000 | Peveler | B60S 9/08 254/419 |
| 6,446,937 B1 | * | 9/2002 | Straw, Sr. | B60S 9/08 248/352 |
| 6,684,726 B2 | * | 2/2004 | Schmidt | B60S 9/08 254/419 |
| 6,846,016 B2 | * | 1/2005 | VanDenberg | B60S 9/08 248/188.2 |

(Continued)

FOREIGN PATENT DOCUMENTS

DE    924788    3/1955
DE    1071314    12/1959
DE    1530784    8/1969

(Continued)

*Primary Examiner* — Monica Carter
*Assistant Examiner* — Seahee Yoon
(74) *Attorney, Agent, or Firm* — Price Heneveld LLP (57) ABSTRACT

A support winch, in particular for utility vehicle trailers, is configured to provide for a height adjustment, and comprises a steep thread drive, wherein the steep thread drive comprises a threaded spindle, wherein a pitch of the thread is adapted for rapid height adjustment.

10 Claims, 4 Drawing Sheets

(56) References Cited

U.S. PATENT DOCUMENTS

| | | | | |
|---|---|---|---|---|
| 7,152,848 B2 * | 12/2006 | Pfleging, Jr. | ............... | B60S 9/08 |
| | | | | 254/419 |
| 2012/0091411 A1 * | 4/2012 | Hansen | .................... | B60D 1/66 |
| | | | | 254/93 R |

FOREIGN PATENT DOCUMENTS

| | | |
|---|---|---|
| DE | 1531327 | 7/1972 |
| DE | 3626621 | 12/1987 |
| EP | 0776285 | 6/1997 |

\* cited by examiner

SUPPORT WINCH

BACKGROUND OF THE INVENTION

The present invention relates to a support winch, in particular for trailers of utility vehicles or commercial vehicles, a locking mechanism, in particular a retraction stop, in particular for support winches for utility vehicle trailers, an extension stop, in particular for support winches for utility vehicle trailers, as well as a method for supporting a device, in particular a utility vehicle trailer.

Support winches of the type in question are basically known in the prior art. Such support winches are attached in pairs at the front of semi-trailers or trailers, in particular of utility vehicles, and serve for supporting a semi-trailer or trailer, which has been decoupled from the truck tractor. In the case of truck tractors with air-suspended rear axle assembles, it is usually not required to balance or adjust the height of a front area of the loaded semi-trailer by means of support winches, since this operation can more easily and more rapidly be done by means of the compressed-air bellows of the truck tractor suspension. Therefore, it is in practice of utmost importance to rapidly adjust the supports from their transport position into their support position. However, the support winches known in the prior art do not allow for a rapid height adjustment or their construction is so simple that, although they allow for a rapid adjustment, they do not allow for an individual adjustment of the height. In most cases known in the prior art, a complex gear mechanism is required in order to adjust the height rapidly.

Therefore, the object underlying the present invention is to provide a support winch, in particular for utility vehicle trailers, a locking mechanism, in particular for support winches for utility vehicle trailers, an extension stop, in particular for support winches for utility vehicle trailers, as well as a method for supporting a device, in particular a utility vehicle trailer, which ensure a rapid adjustment from a transport position to a support position, wherein only few crank rotations are required, and which allow for a simple design and an inexpensive manufacture.

SUMMARY OF THE INVENTION

According to the invention, a support winch, in particular for utility vehicle trailers, which is adapted to provide for a height adjustment, comprises a steep thread drive or high-helix drive, wherein the steep thread drive comprises a threaded spindle, wherein a pitch of the thread is adapted for rapid height adjustment. Advantageously, the support winch comprises an outer support pipe as well as an inner support pipe, wherein within the support winch the steep thread drive, comprising the spindle and a spindle nut, is arranged, wherein the spindle nut moves the inner support pipe along a longitudinal axis. The movement or displacement of the spindle nut is initiated by a rotation of the spindle. Expediently, the outer support pipe and the inner support pipe have corresponding cross-sections, preferably quadrangular cross-sections, particularly preferably also square cross-sections. As a matter of course, also other angled or rectangular geometries, but also round or circular geometries may be used. Expediently, the inner support pipe is thus linearly guided in the outer support pipe. Preferably, the outer support pipe is indirectly and/or directly in a form-fitting and/or in a force-fitting manner connected to a utility vehicle trailer or in general to a device to be supported. As a matter of course, the support winch of the type in question may also be used on vehicles having a drive unit of their own. Thus, the use is not limited to trailers or the like. Likewise, especially in the case of smaller trailers, it may also be sufficient to use one support winch only. Furthermore, the use is not limited to the field of utility vehicles. The support winch may also be used in the field of passenger vehicles or in agriculture. Without limiting the generality, however, hereinafter the term "trailer" is always used to designate the object to the supported. Advantageously, the steep thread drive allows for a very rapid height adjustment, wherein the steep thread drive offers the advantage that any intermediate angle of rotation may be selected and maintained such that the support winch allows for an optimal height positioning. Advantageously, the thread of the spindle is adapted to provide for a rapid height adjustment. Thus, no complex gear mechanism or the like is required in order to provide a rapid height adjustment by means of a suitable transmission ratio. A pitch or a pitch angle of the thread itself advantageously allows for the rapid height adjustment. In this context, pitch means the distance covered during one rotation of the spindle. With reference to the thread, the pitch is the distance along the longitudinal axis of the spindle between adjoining flanks of the same direction of the same thread turn. Preferably, the pitch is more than about 10 mm, particularly preferably more than about 15 mm, and most preferably more than about 20 mm. The pitch angle is calculated from the arc tangent of the pitch divided by the product of flank diameter and the number $\pi$, wherein the flank diameter is the perpendicularly measured distance of two opposing thread flanks. Preferred pitch angles are advantageously in a range of about 10 to 50°, preferably also in a range of more than 50°. It is preferred to use a metric thread, i.e. a thread with a flank angle of 60°, wherein the flank angle is the angle between two thread flanks. However, the use of a trapezoidal thread is particularly preferred. Here, the profile of the thread turns has the shape of an isosceles trapezoid. Advantageously, an ISO metric trapezoidal thread with a flank angle of 30° is used, for example. The trapezoidal thread advantageously allows for high pitches and pitch angles. Moreover, it allows to transmit great axial forces, i.e. forces along the longitudinal axis of the support winch, should this be necessary. As a matter of course, the steep thread pitch may also be designed as a ball screw drive, which possibly allows to further increase the pitch of the spindle thread and the resulting displacement speed. In this case, the spindle is advantageously designed as a ball screw, wherein the thread is adapted accordingly. In this case, the thread forms grooves, wherein suitable balls roll between the spindle nut and the spindle. Expediently, in the spindle nut, a return channel is provided, which also returns the balls so that the balls may circulate. Advantageously, such a rolling elements screw drive is subject to little wear only and allows for very high displacement speeds. Pitch means the distance covered by the spindle nut per rotation of the spindle also in case the spindle is designed as a ball screw. Advantageously, the pitch is about 20 mm or more.

As has already been mentioned, the steep thread drive comprises a spindle nut, which can be arranged on the spindle, wherein a displacement path or traveling distance of the spindle nut along a longitudinal axis of the spindle is larger than about 10 mm when the spindle is rotated by about 360°. To put it differently, the lift of the support winch per one rotation of the spindle is preferably larger than about 10 mm, particularly preferably larger than about 15 mm, and most preferably larger than about 20 mm so that advantageously a very rapid height adjustment of the support winch may be achieved. As has been indicated, the spindle nut can be adapted for the use with a "classic" thread, such as a trapezoidal thread. However, the term "spindle nut" also includes a ball spindle nut, as it is required for ball screw drives. This applies analogously to the constructive design of the spindle thread, which is adapted for a rapid height adjustment, in particular by means of the selected pitch, wherein there is to be no limitation to a certain type of thread.

Expediently, the thread of the spindle is single-start or single-stage and/or multi-start or multi-stage, in particular two-start, three-start or four-start. In the case of multi-start threads, several thread turns are "wound" in parallel about the screw shaft. The thread has so many turns as it has starts of thread. Advantageously, the possible pitch and, thus, the available lift or displacement path per rotation of the support winch may be increased even further. Advantageously, the support winch is lifted more than 20 mm per rotation of the support winch. The pitch is calculated from the product of the turn number and the spacing. The spacing, in turn, describes the distance between adjoining flanks along the longitudinal axis of the spindle. As a matter of course, therefore, the above-described lifts or displacement paths can be significantly increased, such as to values of more than 30 or 40 mm, if there is an adequate number of turns. In a particularly preferred embodiment, a three-start thread is used. This provides a very good compromise of manufacturability, costs and available self-locking. Basically, the thread may be manufactured both by cutting and non-cutting machining and, as has already been indicated, it may be adapted for the use of both "classic nuts" or spindle nuts and as a ball screw drive. The multi-stage thread is advantageously adapted to the support loads occurring since this naturally also influences the friction behavior.

Preferably, the support winch comprises a gear mechanism, in particular a bevel gear stage, wherein the gear mechanism is adapted to drive the steep thread drive and wherein a transmission ratio of the gear mechanism for driving the steep thread drive is larger than 1. This means that, advantageously, for the support winch there is provided a single-stage speed-up gear mechanism comprising a driving bevel gear and a driven bevel gear, wherein a pitch circle diameter of the driven bevel gear upstream of the spindle drive has a smaller diameter than a pitch circle diameter of the driving bevel gear. Advantageously, the gear mechanism can be designed very light-weight and small since it will not be subjected to heavy loads. This allows for many degrees of freedom both with regard to the materials used (e.g. plastic gears) and also with regard to the dimensions. Expediently, the driving bevel gear is connected to a hand crank by means of a suitable mechanism or by means of an input shaft or the like, which hand crank can be actuated by a user. As a matter of course, the gear mechanism makes it possible to increase the displacement speed of the support winch even further. One rotation of the hand crank does not correspond to one rotation of the spindle since the transmission ratio advantageously is selected such that it is larger than 1. The mentioned displacement paths and lifts thus can be increased to a multiple with reference to one rotation of the hand crank. Advantageously, the driven bevel gear is indirectly and/or directly rotationally fixed to the spindle in order to transmit the rotation of the hand crank, for example, to the spindle. To this end, the spindle advantageously has an approximately round or in particular also a circular continuation for connecting it to the driven bevel gear. In a preferred embodiment, the driven bevel gear is designed such that the continuation can be arranged within the driven bevel gear. Thus, advantageously, the driven bevel gear has an approximately round or in particular also a circular connection area.

Expediently, in this case a rotationally fixed connection between the continuation and the driven bevel gear via one or several journals is possible, which are formed either on the continuation or on the connection area and which engage into respective corresponding bearing areas of the driven bevel gear or of the connection area, depending on where the journals are located. Preferably, the bearing areas are formed as bags or recesses. Advantageously, the bearing area(s) extend(s) essentially along the longitudinal axis, while the journals extend approximately radially to the longitudinal axis and engage into the bearing areas/bags. As a matter of course, a rotationally fixed connection between the continuation and the driven bevel gear is possible also by means of a non-rotationally symmetric shape of the continuation and of the connection area. Thus, the continuation and the connection area advantageously may also have an oval or angular cross-section. Advantageously, the support winch has a bearing part, in which the gear mechanism is arranged.

Expediently, the support winch comprises at least one locking mechanism adapted to prevent an undesired height adjustment of the support winch by preventing a rotation of the spindle. When the spindle is rotated, the spindle nut is moved on the spindle along the longitudinal axis, whereby a height adjustment of the support winch is achieved, since the inner support pipe can thus be displaced. Here, the inner support pipe and the spindle nut do not rotate. When a rotation of the spindle is prevented, it is also no longer possible to displace the spindle nut, and the support winch is in a locked position or hold position. In the present case, this is of great importance since, although it is true that a steep thread allows for high displacement speeds with regard to the height adjustment, however, the steeper the thread turns, the more the steep thread is outside the self-locking due to the great pitch angle. In the most unfavorable case, when there is a load on the support winch, the spindle might be twisted by an axial pressure on the spindle nut along the longitudinal axis, which would lead to an undesired retraction of the inner support pipe. The entire trailer would then suddenly move downwards. Therefore, advantageously, at least one locking mechanism is provided, which purposefully can prevent a rotation of the spindle, in particular by preventing a rotation thereof.

Expediently, a first locking mechanism comprises at least one spindle-side engagement region, which can be brought into form-fitting and/or force-fitting engagement with a corresponding stationary engagement region such that the rotation of the spindle is prevented. Here, the term "stationary" means that it is a component or an element of the support winch, which cannot be turned or rotated or which cannot be turned or rotated at least when the two engagement regions are in engagement. Expediently, the stationary engagement region is formed on the bearing part, for example, which also accommodates the gear mechanism. Basically, the principle is based on that the spindle-side engagement region, which as a matter of course can be rotated due to the rotation of the spindle, can no longer be rotated due to the engagement into the stationary engagement region, which then results in that the spindle is held in a fixed position. Advantageously, the spindle-side engagement region is formed on an upper region of the spindle with regard to the longitudinal axis, wherein said positioning, however, is not decisive for the desired locking or holding effect. Advantageously, the spindle-side engagement region is formed at one end of the spindle as an essentially flat dish extending at least in sections beyond an outer diameter of the spindle, wherein this, however, is not mandatory. However, as a matter of course, a surface of the engagement region or of the "dish" extending transverse to the longitudinal axis is advantageously as large as is possible since this may facilitate the engagement into the stationary engagement region and reinforce the locking effect. As a matter of course, the same applies vice versa to the design of the stationary engagement region. The spindle-side engagement region may also be formed as a separate component, which is connected to the spindle at least in a rotationally fixed manner, such as in a form-fitting or in a force-fitting manner, by means of respective journals.

Preferably, the spindle-side engagement region and/or the corresponding stationary engagement region comprise(s) projections and/or recesses extending radially to the longitudinal axis and/or along the longitudinal axis. As a matter of course, the projections and/or recesses may reinforce the form fit and/or the force fit, which is to hinder the rotation of the spindle. Here, the projections and/or recesses may have any design. Advantageously, such projections and/or recesses may be formed with square, triangular or also round or ellipsoidal or sinuous cross-sections. Here, it is always decisive that the design of the projections and/or recesses prevents that the engagement regions turn or rotate relative to each other when the engagement regions are in engagement. As a matter of course, the engagement regions may also be provided with respective structures, in particular surface structures, such as corrugations, which prevent that the engagement regions rotate relative to each other when they are in engagement. In preferred embodiments, it is also possible to do entirely without projections and/or recesses. It would be conceivable to apply a friction-increasing additional layer onto at least one of the engagement regions instead of or together with the use of projections and/or recesses.

Preferably, the spindle is mounted movably along the longitudinal axis, such that the spindle-side engagement region and the corresponding stationary engagement regions may become engaged and disengaged. When the spindle is mounted such that it is axially displaceable or movable, it is in a lower position in the unloaded state, due to its own weight and the weight of the parts connected to it, such as the spindle nut, the inner support pipe, etc. The engagement regions are then separated from each other or spaced apart. Then a load is picked up, i.e. when the load of the trailer is supported by the support winches, since the truck tractor has moved away, for example, the outer support pipe etc. moves axially downwards relative to the spindle. This effect easily brings the stationary engagement region into engagement with the spindle-side engagement region. Advantageously, the first locking mechanism may thus be referred to as a retraction stop. The continuation is advantageously formed for mounting or guiding along the longitudinal axis. Preferably, said continuation has a smaller diameter than the spindle (although this is not necessarily the case) and has a round cross-section, particularly preferably an essentially circular cross-section. Possible embodiments of the rotationally fixed connection between the continuation and the driven bevel gear or the connection area thereof via journals or the cross-sectional shape of the continuation or of the connection area, for example, have already been explained. Basically, it is decisive that the continuation is movably mounted relative to the driven bevel gear along the longitudinal axis, for example in that the journals engage into the bearing areas/bags extending along the longitudinal axis and thus allow for a relative movement of the spindle-side and of the stationary engagement regions. Besides, the first locking mechanism may also be activated in that the inner support pipe rests on the road surface plane when it is extended and, from that point onwards, when the spindle continues to rotate, causes the spindle to lift such that the spindle-side engagement region may be made to engage into the stationary engagement region.

As has already been mentioned, the support winch advantageously comprises a hand crank, in particular in order to actuate the height adjustment of the support winch, wherein the hand crank may be moved between an actuation position and a rest position, wherein in the rest position of the hand crank, the spindle has been displaced by an actuating device such that the form fit and/or force fit, to put it differently the engagement between the spindle-side engagement region and the corresponding stationary engagement region is produced. This means that the above-described effect when the trailer is moved downwards, resulting in that the stationary engagement region is brought into engagement with the spindle-side engagement region in that it comes closer to the latter is reversed in that the actuating device makes it possible to displace the spindle-side engagement region in the direction of the stationary engagement region. Thus, it becomes possible to provide an extension stop preventing an undesired extension of the inner support pipe. The retraction stop may thus be also used as an extension stop. Advantageously, to this end the spindle is moved along the longitudinal axis. To put it differently, all advantages and features of the above-described first locking mechanism apply identically. Finally, the actuating device is provided in order to bring the spindle-side engagement region into engagement with the stationary engagement region, when an automatic height adjustment of the support winch is to be prevented (when the load on it is removed, i.e. when it does not serve to support the trailer). Preferably, the actuating device comprises a lever with a swivel joint or hinge, wherein the lever can be actuated by the hand crank, which has been brought into its rest position, such that the spindle or the spindle-side engagement region may be displaced in the direction of the stationary engagement region or may be brought into engagement with the stationary engagement region. Advantageously, the lever may also be guided towards the outside via a suitable access region in the outer support pipe (possibly also in the inner support pipe) such that it can directly be manually actuated.

Preferably, a second locking mechanism comprises two abutment surfaces, wherein between the abutment surfaces a wedge securing system, in particular a pair of wedge securing discs, is arranged, whereby the abutment surfaces can be braced against each other such that an undesired movement of the abutment surfaces relative to each other can be prevented. As a matter of course, one of the abutment surfaces advantageously is formed on a part of the support winch, which is movable along the longitudinal axis, such as on the spindle nut or the inner support pipe, while the other (corresponding) abutment surface is advantageously formed on a part of the support winch, which is not or hardly movable along the longitudinal axis (such as the spindle). Thus, the second locking mechanism makes it possible that the part of the support winch, which is adjustable along the longitudinal axis, thus, in particular the spindle nut and the inner support pipe, are locked on a part of the support winch, which part is not movable along the longitudinal axis. The wedge securing discs advantageously allow for an automatic release. Thus, preferably, the wedge securing system comprises two wedge securing discs, each having wedge surfaces, wherein the angle of the wedge surfaces is larger than a pitch angle of the spindle thread. When the arrangement is rotated in the release direction, the pretensioning force is increased due to the wedge effect, so that advantageously the wedge securing system makes it possible to prevent an automatic extension of the inner support pipe. The second locking mechanism thus preferably acts as an extension stop. The basic design and structure of such wedge securing discs can be found in the prior art. Here, it is very advantageous to apply the technique, which basically is known as such, to an extension stop.

Expediently, a first abutment surface is formed on the spindle, wherein a second abutment surface is formed on the spindle nut. Advantageously, the spindle-side engagement region comprises the first abutment surface. Basically, it is decisive that the two abutment surfaces are positioned relative to each other such that when the support winch or the inner support pipe is retracted, the wedge securing system, in particular the wedge securing disc pair, may be braced between the abutment surfaces.

Preferably, an automatic extension of the inner support pipe is also prevented in that the gear mechanism, the hand crank and/or a connecting shaft, which is provided in order to couple two support winches, for example, is/are locked by means of a bolt or pin such that a rotation of the spindle is no longer possible.

According to the invention, there is provided a locking mechanism, in particular a retraction stop, in particular for support winches for utility vehicle trailers, wherein a support winch for height adjustment comprises a rotatable spindle, wherein the locking mechanism comprises at least two engagement regions, which can be connected in a form-fitting and/or in a force-fitting manner by displacing the spindle along a longitudinal axis such that a rotation of the spindle may be prevented.

According to the invention, there is provided an extension stop, in particular for support winches for utility vehicle trailers, comprising a pair of wedge securing discs preventing an automatic height adjustment of a support winch. In particular, the extension stop prevents that the inner support pipe extends automatically.

According to the invention, a method for supporting a device, in particular a utility vehicle trailer, comprises the following steps:
  providing a support winch with a spindle, which is movable along a longitudinal axis;
  adjusting the height of the support winch by moving or displacing a spindle nut along a spindle;
  locking the support winch by moving the spindle along the longitudinal axis, wherein said movement activates a locking mechanism.

In particular, the displacement activates a first locking mechanism.

As a matter of course, all advantages and features of the support winch according to the invention apply also to the locking mechanism according to the invention, the extension stop according to the invention as well as the method according to the invention, and vice versa.

Further advantages and features become apparent from the following description of preferred embodiments of the support winch according to the invention, of the locking mechanism according to the invention, of the extension stop according to the invention, and of the method according to the invention with reference to the appended Figures. Individual features of the individual embodiments can be combined within the scope of the invention.

DETAILED DESCRIPTION OF THE PREFERRED EMBODIMENTS

Figure 1A:
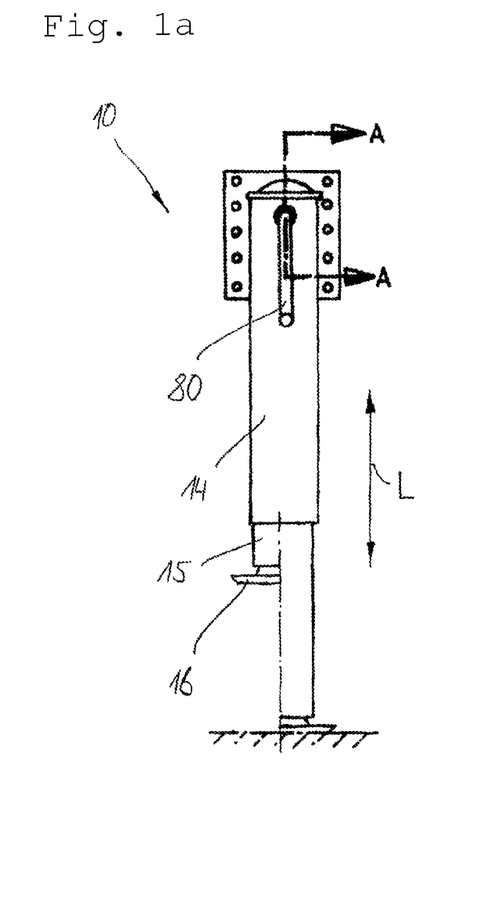
FIG. 1a shows an overview of a preferred embodiment of a support winch of the invention in a front view.
Figure 1B:
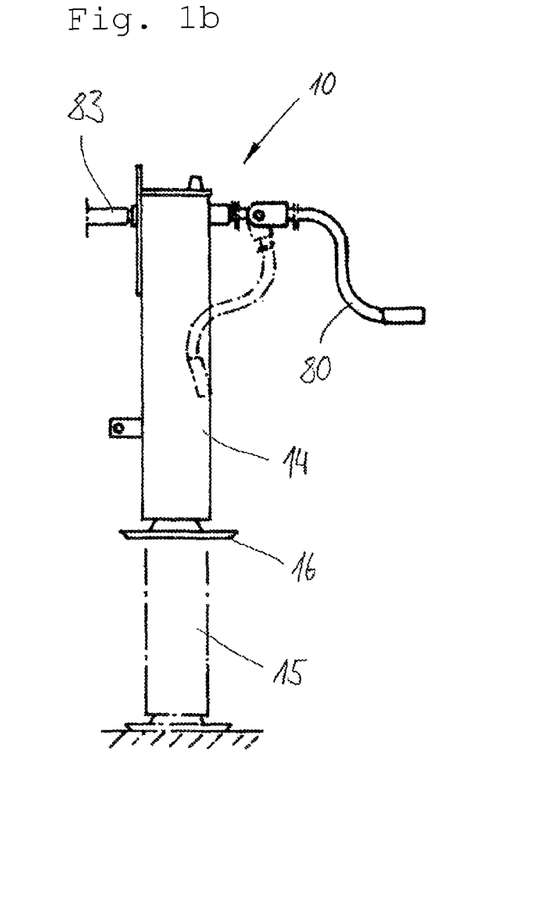
FIG. 1b shown an overview of the preferred embodiment of the support winch of the invention in a side view.

FIGS. 1a and 1b show a front view and a side view, respectively, of a preferred embodiment of a support winch 10. An inner support pipe 15 arranged within an outer support pipe 14 is shown, which inner support pipe 15 is movable along a longitudinal axis L. A support foot 16 connected to the inner support pipe 15 can be made to contact a road surface plane. There is further shown a hand crank 80, by means of which the height adjustment is done. A connecting shaft 83 serves for connecting two support winches 10, which advantageously are arranged in pairs on a trailer, for example. There is also shown a section A-A, which will be discussed in more detail in FIG. 2.

Figure 2:
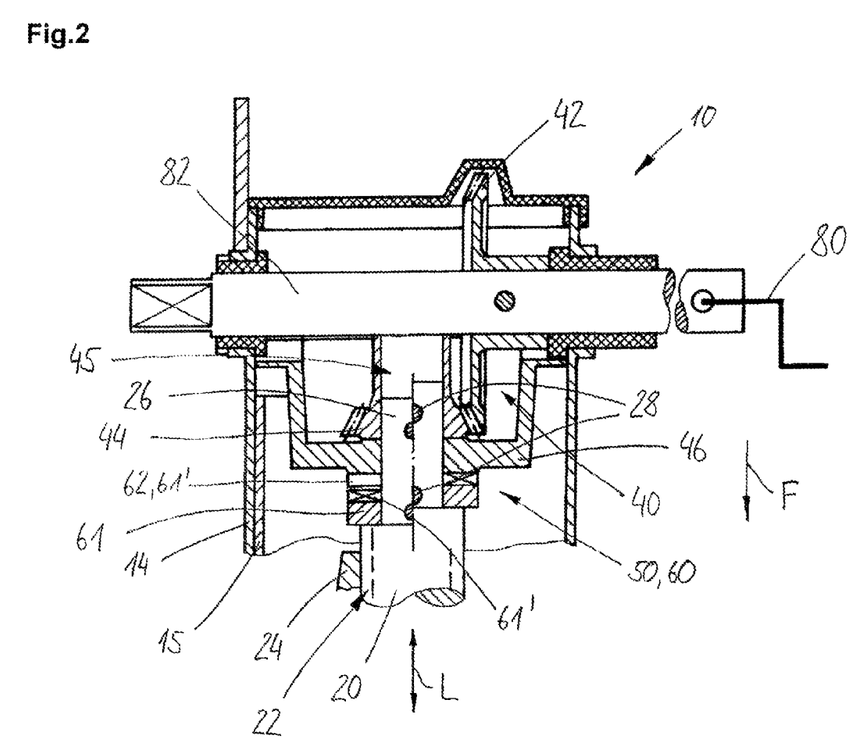
FIG. 2 shows a sectional view of a preferred embodiment of a support winch with a view to a preferred embodiment of a first locking mechanism.

FIG. 2 shows a sectional view of a preferred embodiment of a support winch 10 with a view to a first locking mechanism 60. A hand crank 80, connected to a shaft 82 driving a driving bevel gear 42 is sketchily shown. The driving bevel gear 42 drives a driven bevel gear 44, the diameter of which is smaller than the diameter of the driving bevel gear 42, wherein the driven bevel gear 44 has a connection area 45. A gear mechanism 40 comprising both the driving bevel gear 42 and the driven bevel gear 44 is arranged on a bearing part 46. The driven bevel gear 44 and the connection area 45, respectively, are formed hollow such that within the driven bevel gear 44 a continuation 26 connected to the spindle 20 may be displaced. The continuation 26 and the spindle 20, respectively, are connected to the driven bevel gear 44 in a rotationally fixed manner. The connection area 45 has bearing areas/bags to this end, which, however, are not discernible in the Figure. The spindle-side engagement region 61 is also connected to the spindle 20 via the journal 28, wherein, however, between the spindle-side engagement region 61 and the spindle 20 there need not be provided a relative movement along the longitudinal axis L. Corresponding to the spindle-side engagement region 61, there is provided a stationary engagement region 62 on the bearing part 46. Both engagement regions 61 and 62 are provided with projections and/or recesses 61', which may be brought into engagement. The spindle 20 has a thread 22, which is only sketchily shown by dashed lines. The spindle 20 and the thread 22 are formed as a steep thread drive, wherein the gear mechanism 40 expediently is multi-stage, in particular two-stage, three-stage or four-stage. On the spindle 20, a spindle nut 24 is arranged, which is connected to the inner support pipe 15, which is displaceable along a longitudinal axis L within an outer support pipe 14. FIG. 2 shows two states, wherein in the left half of the Figure a state is shown, where the spindle nut 24 is nearly maximally retracted. In the right half of the Figure, the spindle nut 24 is no longer visible, since it is further below on the spindle 20. Also the inner support pipe 15 is no longer shown. Indeed, however, the stationary engagement region 62 on the bearing part 46 and the spindle-side engagement region 61 are in engagement by means of their projections and/or recesses 61'. In this connection, a force direction F is shown, which causes the spindle-side engagement region 61 and the corresponding stationary engagement region 62 to come into engagement.

Figure 3:
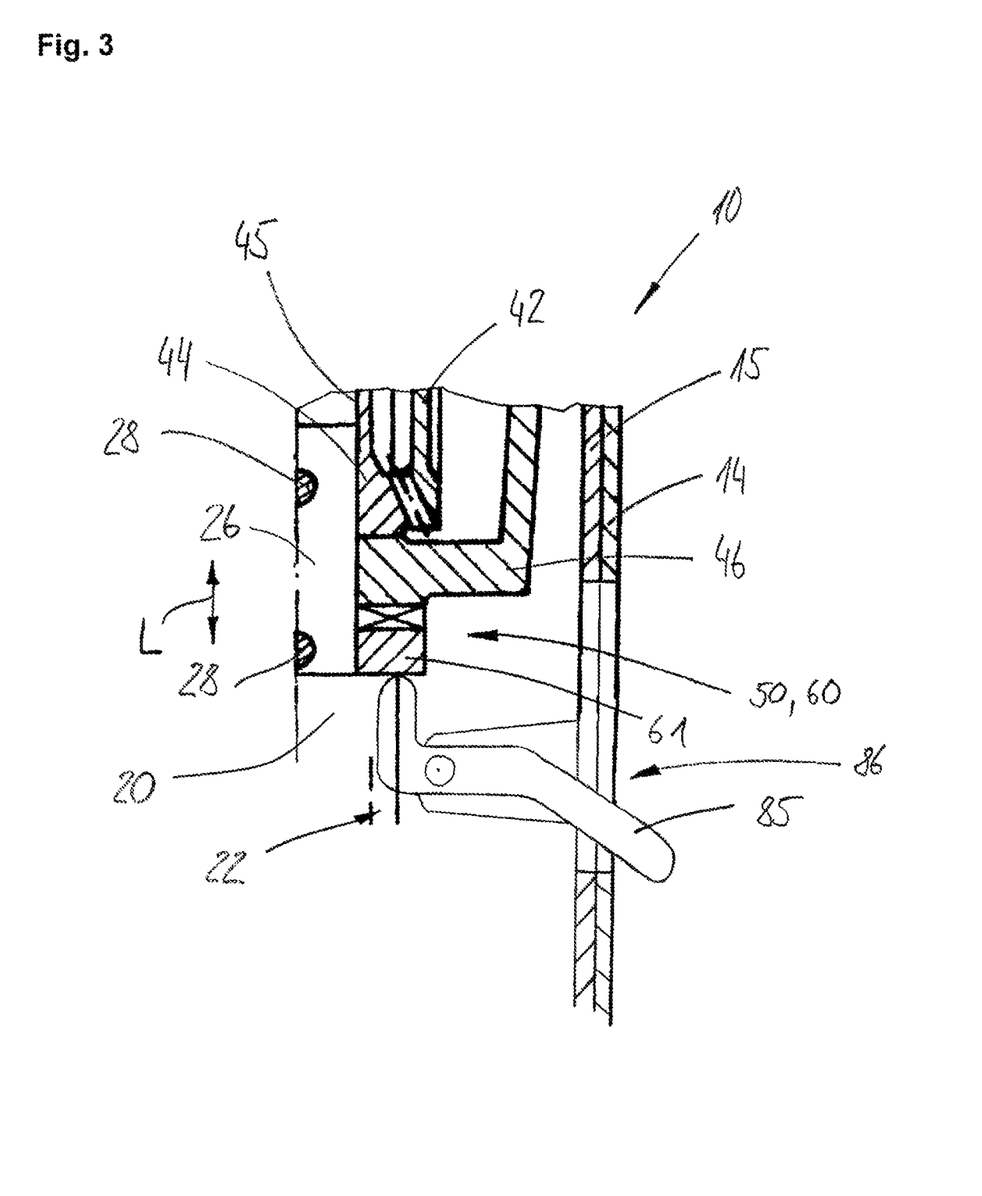
FIG. 3 shows a further sectional view of a preferred embodiment of a support winch with an actuating device.

FIG. 3 shows a segment of a further preferred embodiment of a support winch 10 with an actuating device 85. The structure essentially corresponds to the embodiment disclosed in FIG. 2. There is indicated a driving bevel gear 42 driving a driven bevel gear 44. The driven bevel gear 44 in a rotationally fixed manner is connected to a continuation 26 of a spindle 20 by means of a journal 28. The continuation 26, in turn, is connected by means of a further journal 28 to a spindle-side engagement region 61. A thread 22 of the spindle 20 is again sketchily shown. By means of the lever-shaped actuating device 85, the spindle 20 or the spindle-side engagement region 61 can be displaced or moved along a longitudinal axis L such that a first locking mechanism 60 is activated, so that a rotation of the spindle 20 is no longer possible. An outer support pipe 14 advantageously has an access area 86, by means of which the actuating device can be operated from the outside. Advantageously, also a rest position of a hand crank 80 (not shown here) can be such that the actuating device 85 is hereby positioned such that the first locking mechanism is activated.

Figure 4:
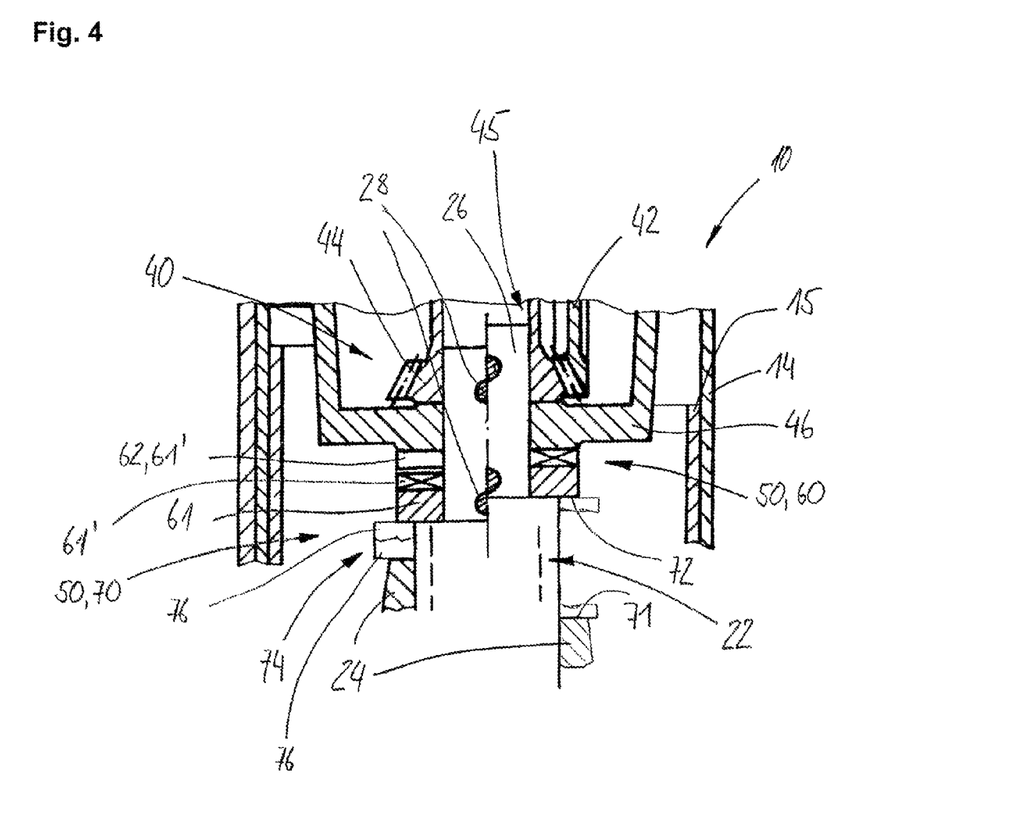
FIG. 4 shows a sectional view of a preferred embodiment of a support winch with a preferred embodiment of a second locking mechanism.

FIG. 4 shows a partial section of a preferred embodiment of a support winch 10 having a wedge securing system 74 as a part of a second locking mechanism 70. The embodiment shown in FIG. 4 thus comprises two locking mechanisms 50. The wedge securing system 74 comprises two wedge securing discs 76, which can be braced relative to each other by means of a first abutment surface 71 and a second abutment surface 72. The second abutment surface 72 is formed at a bottom side of the spindle-side engagement region 61, while the first abutment surface is formed on an upper side of a spindle nut 24. The other components correspond to the embodiment already disclosed in FIG. 2 so that, in order to avoid repetitions, said components are not described again. As a matter of course, the spindles 20 shown in FIGS. 3 and 4, which spindles have the threads 22, are formed as steep thread drives, wherein the gear mechanisms 22 is expediently multi-stage, in particular two-stage, three-stage or four-stage.

LIST OF REFERENCE SIGNS

10 support winch
14 outer support pipe
15 inner support pipe
16 support foot
20 spindle
22 thread
24 spindle nut
26 continuation
28 journal
40 gear mechanism
42 driving bevel gear
44 driven bevel gear
45 connection area
46 bearing part
50 locking mechanism
60 first locking mechanism (retraction stop)
61 spindle-side engagement region
61' projections and/or recesses
62 corresponding stationary engagement region
70 second locking mechanism (extension stop)
71 first abutment surface
72 second abutment surface
74 wedge securing system
76 wedge securing disc
80 hand crank
82 shaft
83 connecting shaft
85 actuating device
86 access region
F direction of force
L longitudinal axis

The invention claimed is:

1. A support winch configured to provide height adjustment for a vehicle, comprising:
    a steep thread drive;
    wherein the steep thread drive comprises a spindle having a thread;
    wherein a pitch of the thread is configured for height adjustment at a first rate;
    wherein the support winch comprises at least one locking mechanism configured to prevent an undesired height adjustment of the support winch by preventing a rotation of the spindle;
    wherein a first locking mechanism comprises at least one spindle-side engagement region that may be brought into at least one of a form-fitting and a force-fitting engagement with a corresponding stationary engagement region such that the rotation of the spindle is prevented; and
    wherein the spindle is mounted such that the spindle is movable along the longitudinal axis, thereby allowing for an engagement and disengagement between the spindle-side engagement region and the corresponding stationary engagement region.

2. The support winch of claim 1, wherein the steep thread drive comprises a spindle nut arranged on the spindle; and
    wherein a traveling distance of the spindle nut along a longitudinal axis of the spindle is greater than about 10 mm when the spindle is rotated by about 360°.

3. The support winch of claim 1, wherein the thread of the spindle comprises at least one of single-start, single-thread, multi-start, and multi-thread.

4. The support winch of claim 3, wherein the thread of the spindle comprises at least one of two-start, two-thread, three-start, three-thread, four-start, and four-thread.

5. The support winch of claim 1, further comprising:
    a gear mechanism, configured to drive the steep thread drive, and wherein a transmission ratio of the gear mechanism for driving the steep thread drive is greater than 1.

6. The support winch of claim 5, wherein the gear mechanism comprises a bevel gear stage.

7. The support winch of claim 1, wherein at least one of the spindle-side engagement region and the corresponding stationary engagement region comprise at least one of projections and recesses extending one of radially to the longitudinal axis and along the longitudinal axis.

8. A support winch configured to provide height adjustment for a vehicle, comprising:
    a steep thread drive;
    wherein the steep thread drive comprises a spindle having a thread;
    wherein a pitch of the thread is configured for height adjustment at a first rate;
    wherein the support winch comprises at least one locking mechanism configured to prevent an undesired height adjustment of the support winch by preventing a rotation of the spindle;
    wherein a first locking mechanism comprises at least one spindle-side engagement region that may be brought into at least one of a form-fitting and a force-fitting engagement with a corresponding stationary engagement region such that the rotation of the spindle is prevented; and further comprising:

a hand crank configured to actuate the height adjustment of the support winch, wherein the hand crank is movable between an actuation position and a rest position, and wherein in the rest position of the hand crank, the spindle is displaced by an actuating device such that the at least one of the form fit and the force fit between the spindle-side engagement region and the corresponding stationary engagement region is produced.

9. A support winch configured to provide height adjustment for a
vehicle, comprising:
a steep thread drive;
wherein the steep thread drive comprises a spindle having a thread;
wherein a pitch of the thread is configured for height adjustment at a first rate;
wherein the support winch comprises at least one locking mechanism configured to prevent an undesired height adjustment of the support winch by preventing a rotation of the spindle; and
wherein a second locking mechanism comprises two abutment surfaces, wherein a wedge securing system is arranged between the abutment surfaces, whereby the abutment surfaces are braced against each other such that an undesired relative movement of the abutment surfaces is prevented.

10. The support winch of claim 9, wherein a first abutment surface is located on the spindle, and
wherein a second abutment surface is located on the spindle nut.

* * * * *